United States Patent
Svanebjerg

(10) Patent No.: US 8,967,542 B2
(45) Date of Patent: Mar. 3, 2015

(54) DYNAMIC DE-ICING DISTANCE

(75) Inventor: Elo Svanebjerg, Tappernøje (DK)

(73) Assignee: Vestergaard Company A/S, Roskilde (DK)

( * ) Notice: Subject to any disclaimer, the term of this patent is extended or adjusted under 35 U.S.C. 154(b) by 33 days.

(21) Appl. No.: 13/384,047

(22) PCT Filed: Jul. 16, 2009

(86) PCT No.: PCT/IB2009/053083
§ 371 (c)(1),
(2), (4) Date: Mar. 2, 2012

(87) PCT Pub. No.: WO2011/007200
PCT Pub. Date: Jan. 20, 2011

(65) Prior Publication Data
US 2012/0153032 A1    Jun. 21, 2012

(51) Int. Cl.
*B05B 13/04* (2006.01)
*B64D 15/10* (2006.01)
*B64F 5/00* (2006.01)
*G01S 17/48* (2006.01)
*G01S 17/88* (2006.01)

(52) U.S. Cl.
CPC .............. *B64F 5/0063* (2013.01); *G01S 17/48* (2013.01); *G01S 17/88* (2013.01)
USPC ................ 244/134 C; 244/134 R; 239/160

(58) Field of Classification Search
USPC ............ 244/134 C, 134 R; 15/53.1; 239/159, 239/160, 164, 165, 172
See application file for complete search history.

(56) References Cited

U.S. PATENT DOCUMENTS

| | | | |
|---|---|---|---|
| 5,244,168 A * | 9/1993 | Williams | 244/134 R |
| 5,248,341 A | 9/1993 | Berry et al. | |
| 5,318,254 A * | 6/1994 | Shaw et al. | 244/134 C |
| 6,029,934 A * | 2/2000 | Foster | 244/134 C |
| 6,250,588 B1 * | 6/2001 | Numbers et al. | 244/134 C |
| 6,477,730 B1 * | 11/2002 | Marrero | 15/53.1 |
| 6,547,187 B2 * | 4/2003 | Foster | 244/134 C |
| 6,616,102 B1 * | 9/2003 | Bond | 244/134 R |
| 6,907,799 B2 * | 6/2005 | Jacobsen et al. | 73/865.8 |
| 7,194,334 B2 * | 3/2007 | Laski | 700/245 |
| 7,431,240 B1 * | 10/2008 | Stanko et al. | 244/134 C |
| 7,850,120 B2 * | 12/2010 | Svanebjerg | 244/134 C |

(Continued)

FOREIGN PATENT DOCUMENTS

| | | | |
|---|---|---|---|
| EP | 0543603 B1 * | 11/1995 | |
| EP | 1 775 218 | 4/2007 | |
| EP | 1775218 A1 * | 4/2007 | |

OTHER PUBLICATIONS

International Search Report for PCT/IB2009/053083.

(Continued)

*Primary Examiner* — Tien Dinh
*Assistant Examiner* — Michael Wang
(74) *Attorney, Agent, or Firm* — Stephen J. Weyer; Stites & Harbison PLLC

(57) ABSTRACT

A method for at least partially de-icing an aircraft by applying a de-icing fluid through a nozzle (10) is disclosed. The method involves the steps of: measuring a distance to an outside surface of the aircraft, applying the distance in an evaluation, controlling the position and/or the orientation of the nozzle (10) according to the evaluation, and applying the de-icing fluid at least a part of the outside surface trough the nozzle. In addition, a system for performing the de-icing method is also revealed.

25 Claims, 9 Drawing Sheets

(56) References Cited

U.S. PATENT DOCUMENTS

| | | | |
|---|---|---|---|
| 7,934,467 B2 * | 5/2011 | Morton | 118/695 |
| 8,197,609 B2 * | 6/2012 | Alvestig et al. | 134/18 |
| 2010/0300660 A1 | 12/2010 | Bourgault | |

OTHER PUBLICATIONS

International Preliminary Report on Patentability for PCT/IB2009/053083.

* cited by examiner

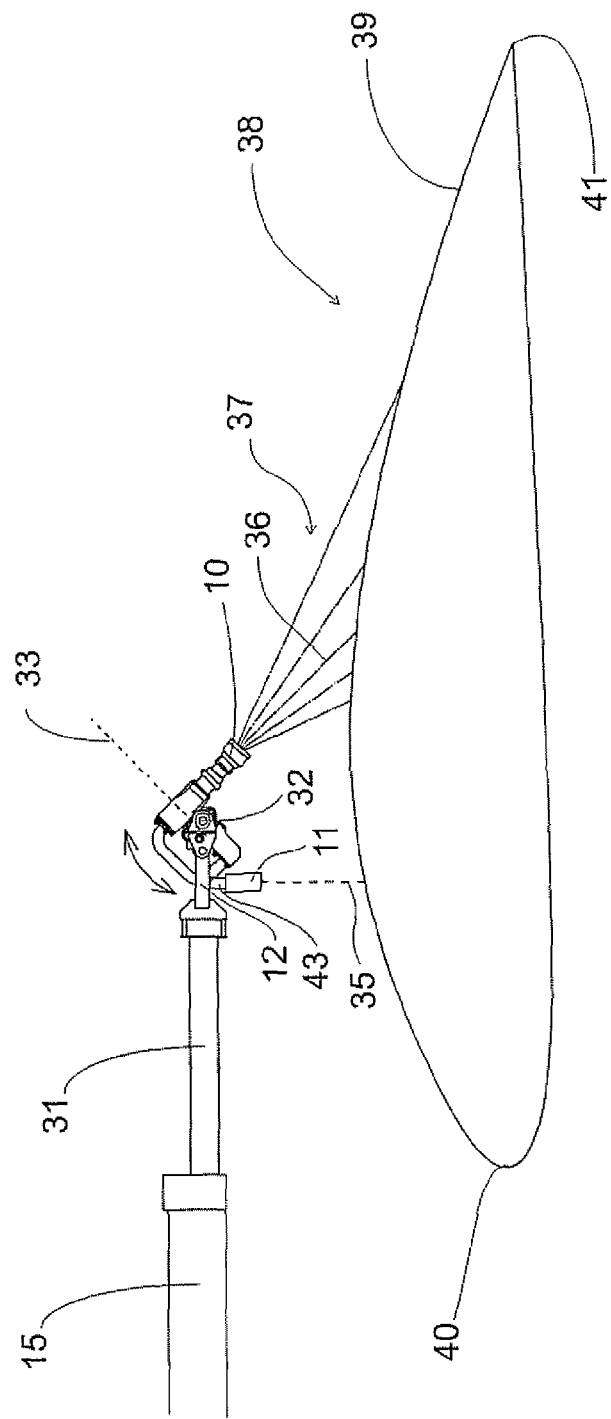

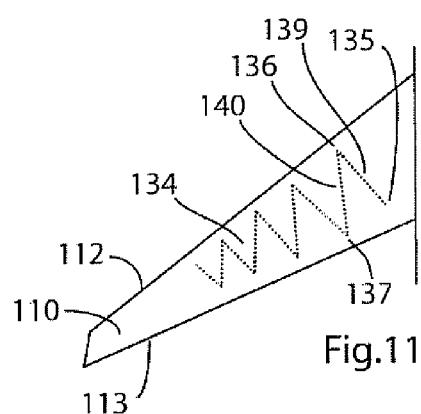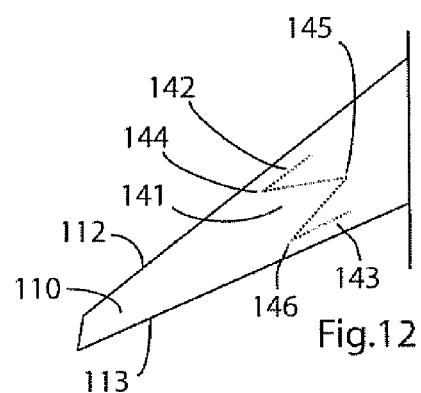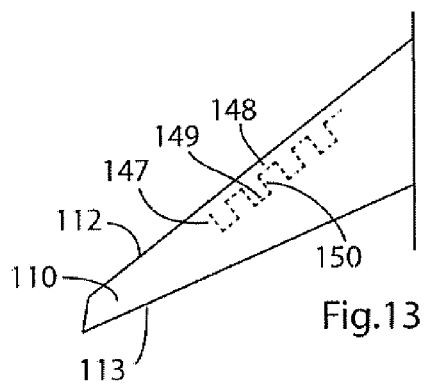

DYNAMIC DE-ICING DISTANCE

FIELD OF THE INVENTION

The present invention generally relates to de-icing of an aircraft wing, and in particular to the application of the de-icing fluid. More specifically, the present invention relates to a de-icing method involving a nozzle and a distance sensor, where the latter is employed to determine the distance between the nozzle and the aircraft wing.

DESCRIPTION OF THE RELATED ART

Under freezing conditions, the de-icing of an aircraft may be critical for its flight performance. Ice may degrade the ability of an aircraft wing to generate a lift force. For an aircraft in self propelled motion, pieces of ice may come loose and cause damage by hitting the tail or tail fins, or by being sucked into an engine or hitting a propeller, which may have catastrophic effects. Further, ice may prevent important control surfaces, such as flaps and elevators, from operating properly.

Here the term de-icing means the removal of ice or the prevention of ice to form. The term de-icing may also mean a combination of a removal of ice and prevention of ice to form. One method of de-icing involves a heating of the ice. In practise, this is commonly achieved by subjecting the ice to a hot fluid, usually a liquid. Another method involves the application of chemicals to the ice to lower the freezing point of water, the chemicals typically being monopropylene glycol or ethylene glycol. The methods of heating and applying a chemical may be employed separately, i.e. in two separated steps, or in combination, i.e. in a single step. The liquid for the removal of ice commonly has a low viscosity, whereby it easily runs off the surface of an aircraft wing after being applied. The liquid for prevention of ice to form may have a high viscosity, whereby it sticks to the surface of the aircraft wing and prevents the build-up of a layer of ice. Further, the term de-icing may also mean the removal of frost or snow, or the prevention of frost or a layer snow to form. For example, a heated glycol and water mixture is commonly employed for removing ice, frost and snow.

The de-icing fluid is commonly applied to an aircraft wing by a nozzle. The distance between the nozzle and the surface of the wing is important for both the temperature of the fluid, as a heated fluid cools when it travels between the nozzle and the wing, and for the amount of fluid per unit area and unit time that is applied to the wing, as the nozzle commonly disperses the fluid. For this reason, the distance between the nozzle and the surface is an important factor to control for an efficient de-icing.

In EP1775218A1 a vehicle for de-icing an aircraft is disclosed, where the vehicle in question is capable of automatically achieving a spraying pattern. However, the distance between the nozzle and the aircraft body or aircraft wing is not considered in the de-icing.

OBJECT OF THE INVENTION

An object according to the present invention is to achieve a more efficient de-icing of aircraft wings. An advantage according to the present invention is that it allows for a reduction of the amount of de-icing fluid used and of the time needed for de-icing. A particular feature of the present invention is that it allows for a de-icing that takes the distance between the nozzle applying the de-icing fluid and the wing surface into account when controlling the position of the nozzle. An additional object according to the present invention is to provide safer de-icing techniques avoiding or reducing the risk for accidents to occur.

SUMMARY/DISCLOSURE OF INVENTION

The above object, the above advantage and the above feature, together with numerous other objects, advantages and features, will be evident from the detailed descriptions given below of preferred embodiments according to the present invention. The objects, advantages and features are according to a first aspect of the present invention obtained by a method for at least partially de-icing an aircraft by applying a de-icing fluid through a nozzle, the method comprising the steps of: measuring a first distance along a measurement direction from a first location relative to the nozzle to a physical outside surface of the aircraft, applying the first distance in a first evaluation, controlling the position and/or the orientation of the nozzle according to the first evaluation, and applying the de-icing fluid to at (east a part of the physical outside surface trough the nozzle.

The nozzle may be a spray nozzle for distributing a liquid over a surface. Liquid projected from the nozzle may on a flat surface define a circle, an ellipse, a rectangle, a square, a triangle, or combination thereof. The nozzle position defined by the nozzle may be relative to a fix point on the airplane, to a fix point on the ground, to a distant transponder, or to a fix point on a vehicle chassis providing ground support for the support arm. Similarly, the nozzle orientation may be defined by the nozzle position relative to a fix point on the airplane, to a fix point on the ground, to a distant transponder, to a fix point on vehicle chassis providing ground support for the support arm. Alternatively, the nozzle orientation may be relative to the support arm.

The nozzle orientation may be defined as the principal fluid application direction of the nozzle, i.e. the general direction of fluid expelled from the nozzle. If pointed at a planar surface and a liquid projected from the nozzle defines an area on the surface, the fluid application direction may be defined by a line between the nozzle position and the geometric centre of this area. Alternatively, the fluid application direction may be defined as the general or average direction of the spray from the nozzle.

The first location may correspond to the physical location of a sensor, or to a location derived by a sensor. For example, if a triangulation sensor is employed, the first location may correspond to the position of the emitter and the measurement direction may correspond to the emitted measurement signal. Alternatively, the first location may correspond to the position of the receiver and the measurement direction may correspond to the reflected measurement signal The measurement direction defined by the distance sensor may be the intended principal direction for measurements by the instrument or sensor employed. Alternatively, the measurement direction may be defined relative to the nozzle orientation or the fluid application direction. For example, the fluid application direction and the measurement direction may be parallel.

The physical outside surface of the aircraft may be on the wings, the tails, and/or the fuselage. Preferably, the physical outside surface is the upper side of the wing of an aircraft.

By the first location and the nozzle defining a first separation between them means that they together define a derivable separation and a derivable relative positioning, e.g. a separation that can be measured physically. The first position has a given position relative to the nozzle and the first measurement has the first location as its starting point. This means that, with the first distance known, the distance between the nozzle and the physical outside surface may be derived.

The first location and the nozzle may define a fixed first separation between them. Alternatively, the first location and the nozzle may define a variable first separation between them, e.g. by sliding the nozzle along a rail while maintaining the first location fixed.

The first evaluation of the first distance according the first aspect of the present invention may involve a direct application of the first distance to an evaluation algorithm. The evaluation algorithm may for example subtract the first distance from a reference distance to determine which of the distances that is the largest. The evaluation may also involve other parameters than the first distance and more complex functions, e.g. the first distance and the angle between the measurement direction and a vertical line may be applied to a trigonometric function to derive the vertical distance between the distance sensor and an airplane wing, where the vertical distance is evaluated in a subtraction as mentioned above.

In the operational step of controlling the nozzle position and/or nozzle orientation, the term controlling is understood to encompass the changing of the nozzle position and/or nozzle orientation and the maintaining of the current nozzle position and/or nozzle orientation according to the first evaluation.

The de-icing fluid according to the first aspect of the present invention may be a fluid specifically intended for removing ice or snow, or for preventing a layer of ice or snow to form. The fluid may be a liquid that is containing chemicals, such water and glycol mixtures, which are suitable for de-icing. Further, the de-icing fluid may be heated, which improves the de-icing. The fluid may also be gaseous, such as compressed air, which is primarily used to remove snow or sleet on the aircraft wing. A de-icing liquid may be applied following the application of the gaseous de-icing fluid. If applying both a gaseous de-icing fluid and a de-icing liquid, this may be performed consecutively through the same nozzle, or through two separate nozzles, either consecutively or simultaneously.

The step of applying the first distance in the first evaluation may comprise the sub-steps of: providing a first reference distance, comparing the first distance and the first reference distance, and the step of controlling the position and/or the orientation of the nozzle according to the first evaluation may comprise the sub-steps of: moving the nozzle away from the physical outside surface if the first distance is smaller than the first reference distance. This enables the nozzle to be automatically kept outside a minimum distance from the physical outside surface of the aircraft, where the minimum distance is defined by the first reference distance. This way, with a constant flow of de-icing fluid, the amount of de-icing fluid per unit area and unit time that is applied on the physical outside surface may be limited to prevent an unnecessary consumption of de-icing fluid. Further, the minimum distance may also prevent the nozzle from colliding with the physical outside surface, which is a particular advantage if the nozzle is manually operated to sweep over and across the physical outside surface. As the operator does not have to consider the danger of collisions during de-icing, the operator can instead fully concentrate on the actual de-icing.

The step of applying the first distance in the first evaluation may comprise the sub-steps of: providing a second reference distance, comparing the first distance and the second reference distance, and the step of controlling the position and/or the orientation of the nozzle according to the first evaluation may comprise the sub-steps of: moving the nozzle towards the physical outside surface if the first distance is larger than the second reference distance. This enables the nozzle to be automatically kept inside a maximum distance from the physical outside surface of the aircraft, where the maximum distance is defined by the second reference distance. This ensures that, with a constant flow of de-icing fluid, a certain minimum amount of de-icing fluid per unit area and unit time that is applied on the physical outside surface is reached.

The first reference distance and the second reference distance may be the same, or approximately the same, which means that in controlling the position of the nozzle, the position of the nozzle will be adjusted continuously so that the nozzle may define an approximately constant distance to the physical outside surface.

The step of controlling the position and/or the orientation of the nozzle according to the first evaluation may further comprise the sub-step of: changing the position and/or the orientation of the nozzle according to the first evaluation.

In the method according to the first aspect of the present invention the measurement direction may be vertical. When applying a de-icing fluid to the aircraft wing, the ice or snow is generally forced in a direction roughly parallel to the upper surface of the aircraft wing. The upper surface in turn defines a normal that, for most of its area, is roughly vertical. Hence, most of the ice will move in a direction perpendicular to the measurement direction, thus causing less noise or disturbances in the distance measurement.

The physical outside surface may be an aircraft wing and the method may further comprise the steps of: providing a detection of a physical edge of the aircraft wing, the detection being along a detection direction from a second location, the second location and the nozzle defining a second separation between them, applying the detection in a second evaluation, and controlling the position and/or the orientation of the nozzle according to the second evaluation. Here, the physical edge may be the leading edge or the trailing edge of the aircraft wing. The detection of a physical edge has the advantage that the de-icing may be adapted and optimized with respect to the relative location of the edge. The method according to the first aspect of the present invention may further comprise the step of: applying the first distance in the second evaluation. This has the advantage that an evaluation can be performed taking the detection of the edge and the distance into account simultaneously. For example, the distance to the edge may be determined.

The detection may be the result of a large increase of the first distance when the measurement direction falls outside the aircraft wing, i.e. when it no longer point at its upper surface. If the measurement is short ranged, the detection of the edge may correspond to the loss of a reflection signal, e.g. an ultrasonic reflection signal, when the measurement direction falls outside of the aircraft wing; or conversely, the appearance of a reflection signal when the measurement direction falls upon the aircraft wing. The detection direction may be defined as the intended direction of measurement of the sensor employed. Further, the detection direction may be determined as the direction of an emitted detection signal, or the direction of an reflected signal, or an combination of both.

The first location and the second location may be the same. Additionally or alternatively, the measurement direction and the detection direction may be co-linear. This has the advantage that the location of a point or a section of the edge can readily be determined.

The method according to the first aspect of the present invention may further comprise the step of: positioning the nozzle above the aircraft wing. This step may be the first step of a de-icing operation. Further, it may be performed manually by an operator.

The step of controlling the position and/or the orientation of the nozzle according to the first evaluation and/or the step of controlling the position and/or the orientation of the nozzle according to the second evaluation may further comprise the sub-step of: moving the nozzle along a first path above the aircraft wing.

Here, moving along a first path may mean a movement over a part of or the complete length of a fluid application path. This feature allows for an automated movement of the nozzle with respect to an aircraft wing, which enables an optimization of de-icing with respect to the amount of de-icing fluid used or the time needed for de-icing. Here, moved along the fluid application path means that the nozzle traces along the fluid application path.

Further, the fluid application path may correspond to any continuous curve in two-, or three-dimensions, for example a straight line, a circle, or a helix. Knowing the fluid application path, this feature has the advantage that the amount of de-icing fluid applied to a whole wing can be estimated or calculated beforehand, which in turn means that the de-icing can be optimized with respect to de-icing time and de-icing fluid consumption. The flow rate of the de-icing fluid may depend on the position along the fluid application path.

The fluid application path may be circular arc, which has the advantage that, with an extendable support arm at its maximum extension, it allows for a maximum reach or area coverage for the nozzle.

The fluid application path may define a fixed horizontal distance to the bisector defined by the leading and the trailing edges. This feature has the advantage that the de-icing may be concentrated at the centre of an aircraft wing. Further, several operators may work together to de-ice an aircraft wing, where each operator has been given a unique fixed horizontal distance, such that they in unison cover the whole upper surface with de-icing fluid. This way the de-icing can be completed more quickly. Here, the fixed horizontal distance corresponds to a substantially constant horizontal distance component, which may be zero, i.e. the fluid application path follows a path directly above the bisector. Two previously measured sets of data may be employed for determining the bisector of an aircraft wing, the first set corresponding to a position of a point on the leading edge, and the second set corresponding to a position of a point on the trailing edge, where the bisector is determined as the middle point on a straight line between these two points. Alternatively, the bisector may be determined as the middle point of the shortest path tracing the upper convex surface of an aircraft wing, and that goes between a point on the first edge and a point on the second edge.

The fluid application path may define a series of single-loops when projected onto a horizontal plane and each single loop of the series of single loops crosses itself once. Here, a single-lop may correspond to a smooth curve without sharp turns, to a polygon, or to a curve having both sharp and smooth turns. The single-loops may be such that they are parallel to a part of the first edge or the second edge. This way, the de-icing may be more concentrated to the edge in question.

The step of applying the first distance in a first evaluation and/or the step of applying the detection in a second evaluation may further comprise the sub-step of: determining the location of a first start point and the location of a first end point relative to the physical edge of the aircraft wing for the first path.

Several operators may work together to de-ice an aircraft wing, where each operator has been given a unique first start point and a unique first end point, such that they in unison cover the whole upper surface with de-icing fluid by tracing their respective first paths. This way the de-icing can be completed more quickly.

The first start point may be closer to the trailing edge than the first end point and the first end point may be closer to the leading edge than the first start point. This has the effect that the first path to some extent transverses the aircraft wing.

The step of applying the first distance in a first evaluation and/or the step of applying the detection in a second evaluation may further comprise the sub-step of: determining the location of a second start point and the location of a second end point relative to the physical edge of the aircraft wing, the second start point being closer to the leading edge than the second end point and the second end point being closer to the trailing edge than the second start point, and the step of controlling the position and/or the orientation of the nozzle according to the first evaluation and/or the step of controlling the position and/or the orientation of the nozzle according to the second evaluation may further comprise the sub-step of: moving the nozzle along a second path from the second start point to the second end point. This has the effect that the second path to some extent transverses the aircraft wing.

The first end point of the first path and the second start point of the second path may have the same location and join the first path and the second path, or the second end point of the second path and the first start point of the first path may have the same location and join the second path and the first path. This has the effect that the combined first and second paths enable a automated and repeated crossing of the nozzle above the wing, e.g. in a zigzag pattern.

The step of applying the first distance in a first evaluation and/or the step of applying the detection in a second evaluation may further comprise the sub-step of: determining the location of a third start point and the location of a third end point, the third start point and the third end point having approximately the same distance to the leading edge or the trailing edge of the aircraft wing, the step of controlling the position and/or the orientation of the nozzle according to the first evaluation and/or the step of controlling the position and/or the orientation of the nozzle according to the second evaluation may further comprise the sub-step of: moving the nozzle along a third path from the third start point to the third end point. This has the effect that the nozzle to some extent moves along the wing, either from the tip of the wing towards the fuselage, or from the fuselage towards the tip of the wing.

The first path may be in a first vertical plane and/or the second path may be in a second vertical plane and/or the third path may be in a third vertical plane. These features have the effect that the movement of the nozzle defines one or more straight lines when projected onto a horizontal surface. This has the advantage that the position of the nozzle can be adjusted dynamically according to the first distance or the detection of the physical edge, even though sideway movements are not allowed.

Further, the first vertical plane and the second vertical plane may be parallel. This enables the nozzle to quickly cross the wing back and forth, e.g. in a square pattern. The third path may define an approximately constant distance to the leading edge or the trailing edge of the aircraft wing.

The first end point of the first path and the third start point of the third path may have the same location and joining the first path and the third path, or the second end point of the second path and the third start point of the third path may have the same location and joining the second path and the third path. Further, the third end point of the third path and the second start point of the second path may have the same location and joining the third path and the second path, or the third end point of the third path and the first start point of the first path may have the same location and joining the third path and the first path. This enables the wing to quickly move along the wing. It also enables the nozzle to move in a square or trapezoid pattern.

The step of controlling the position and/or the orientation of the nozzle according to the second evaluation may further comprise the sub-step of: providing a minimum horizontal displacement between the nozzle and the edge of the aircraft wing. This has the advantage that the nozzle, when it is moving atop of the wing, it will not cross the edge. Further, with the minimal horizontal displacement can be chosen so that the loss of the amount of de-icing missing the wing is lowered.

The first path and/or the second path and/or the third path may be a linear segment of a zigzag pattern of a fluid application path for the nozzle. If the zigzag pattern generally defines a movement component in the direction of the tip of the aircraft wing, e.g. by repeatedly crossing the bisector of the wing, this feature allows for a fast sweep with the nozzle over the aircraft wing. This may be favourable for removing thin layers of ice or snow, e.g. frost, where only a small amount of de-icing liquid per unit area is needed.

The first path and/or the second path and/or the third path may be a linear segment of a square or trapezium pattern of a fluid application path for the nozzle. This may be favourable for removing thicker layers of ice or snow, since the path length for these patterns is generally longer than that of zigzag patterns, which allows for a larger amount of de-icing liquid per unit area to be deployed.

The objects, advantages and features are according to a second aspect of the present invention obtained by a method for at least partially de-icing an aircraft wing by applying a de-icing fluid through a nozzle, the method comprising the steps of: providing a detection along a detection direction of a physical edge of the aircraft wing, applying the detection in a second evaluation, controlling the position and/or the orientation of the nozzle according to the second evaluation, and applying the de-icing fluid to at least a part of the aircraft wing trough the nozzle. Here, the physical edge may be the leading edge or the trailing edge of the aircraft wing. The detection of a physical edge has the advantage that the de-icing may be adapted and optimized with respect to the relative location of the edge.

The detection may be the result of a large increase of the first distance when the detection direction falls outside the aircraft wing, i.e. when it no longer point at its upper surface. If the measurement is short ranged, the detection of the edge may correspond to the loss of a reflection signal, e.g. an ultrasonic reflection signal, when the measurement direction falls outside of the aircraft wing; or conversely, the appearance of a reflection signal when the measurement direction falls upon the aircraft wing.

In the method according to the first and the second aspects of the present invention, the step of controlling the position and/or the orientation of the nozzle according to the second evaluation may further comprise the sub-step of: changing the position and/or the orientation of the nozzle according to the second evaluation. The changing of the position and/or orientation enables an automated de-icing that takes the relative position of the edge into account.

In the method according to the first and the second aspects of the present invention, the step of controlling the position and/or the orientation of the nozzle according to the second evaluation may further comprise the sub-step of: discontinuing a change in the position and/or the orientation of the nozzle according to the second evaluation. This allows for the de-icing to be automatically interrupted when the nozzle reaches an edge of aircraft wing, thereby preventing automated movement outside of the upper surface of the aircraft wing. This may also have the advantage that less de-icing fluid will miss the upper surface of the aircraft wing.

The method according to the first and the second aspects of the present invention may further comprise the step of terminating the application of the de-icing fluid according to the second evaluation. This feature has the advantage that the amount of de-icing fluid that misses the aircraft wing may be reduced, or for that matter, the time for de-icing an aircraft wing is shortened.

The objects, advantages and features are according to a third aspect of the present invention obtained by a system for at least partially de-icing a physical outside surface of an aircraft by applying a de-icing fluid, the system comprising: a nozzle for applying a de-icing-fluid to the physical outside surface, a first sensor for measuring a distance to the physical outside surface of the aircraft and/or for performing a first detection of a physical edge of an aircraft wing, evaluation means for applying the distance and/or the first detection in one or more evaluations, and control means for changing the position and/or the orientation of the nozzle according to the one or more evaluations.

The first sensor may be a direct reflection sensor, e.g. ultrasonic, infrared LED, laser diode, and radar range finders; or a triangulation sensor, e.g. an infrared LED, laser diode triangulation range finder. The first sensor may be a single unit comprising both emitter and sensor in a common housing, or a dual unit comprising emitter and sensor in separate housings, where the latter is more common in connection with triangulation sensors. Preferably, the first sensor is an ultrasonic direct reflection range finder. The first sensor may be a two-dimensional scanner, e.g. a rotating or swivelling time-of-flight laser range finder, or a laser triangulation sensor with the laser and/or the sensor having an adjustable position and/or orientation.

The evaluation means according to the third aspect of the present application may further comprise an evaluation circuit. The evaluation circuit may be in communication with the first distance sensor by a connection, and a signal corresponding to the distance may be sent from the distance sensor through the connection to the evaluation circuit. The evaluation circuit may be a purely analogue circuit, or it may involve digital components.

The evaluation means may be in communication with the control means to provide it with control signals according to the one or more evaluations. The control signal may be an audio signal and/or a visual signal transmitted to an operator, e.g. a warning signal that the nozzle is closer than a certain distance to an aircraft wing may be transmitted via a loud speaker, a lamp, and/or a display. The control signal may comprise data corresponding to data from the first sensor that is displayed to an operator, e.g. the measured distance that is displayed on a LCD.

The control means according to the third aspect of the present application may further involve a control circuit for controlling of the nozzle position and/or nozzle orientation. The control means may be provided with instruction for an automated control system to change the nozzle position and/or the nozzle orientation. Further, the control means may also be provided with instruction for maintain the current nozzle position and/or the nozzle orientation. Further, the control means may involve an automated control system, which means that the de-icing can readily be performed under bad visual conditions, making the de-icing less dependent on commands from an operator. The control means may comprise a pneumatic, hydraulic, and/or electric system to affect mechanical motion and change the position and/or orientation of the nozzle.

The control means may comprise: a first pivot support for supporting the nozzle and for changing the orientation of the nozzle. In the controlling of the nozzle orientation the fluid application direction may be changed by a pivoting of the nozzle by the first pivot support, where the pivoting defines an angular velocity. This enables the de-icing fluid that is projected onto the aircraft wing to force the snow or ice to be swept in the direction corresponding to the change in the fluid application direction. The angular velocity may be constant or variable. Additionally or alternatively, the angular velocity may be function of the measurement direction and/or the orientation of the nozzle. At a fixed nozzle position, a rotation of the nozzle will change the distance travelled by the de-icing fluid between the nozzle and the aircraft wing. In a rough model, the upper surface of the aircraft wing corresponds to a horizontal surface. If the nozzle is positioned directly above the aircraft wing, the distance travelled by the de-icing fluid increases with an increased tilting angle between the fluid application direction and a vertical axis. Under these conditions, in order to supply an even layer of de-icing fluid to the aircraft wing, the rotation velocity must decrease with an increased tilting angle.

The control means may further comprises: a support arm having a first proximal end and a first distal end, the first pivot support being connected to the support arm at the first distal end. Further, the support arm may be extendable for changing the position of the nozzle, which means that it may vary its length. The control means may further comprise: a second pivot support for supporting the support arm at the first proximal end of the support arm for changing the position and orientation of the nozzle. Additionally or alternatively, the control means may further comprise: a boom having a second proximal end and a second distal end, the second pivot support being connected to the boom at the second distal end. The boom may be articulated for changing the position and orientation of the nozzle. Alternatively or additionally, the boom may be extendable for changing the position of the nozzle. The control means may further comprise: a third pivot support for supporting the boom at the second proximal end of the boom for changing the position and orientation of the nozzle. Additionally or alternatively, the control means may further comprise: a land vehicle supporting the boom via the third pivot support for changing the position and orientation of the nozzle relative to the surroundings. The land vehicle may further comprise: a source of the de-icing fluid, and a pump system to provide a pressurized flow of the de-icing fluid from the source of the de-icing fluid to the nozzle.

The de-icing fluid may be a mixture of ethylene glycol or propylene glycol and water, or a mixture of ethylene glycol, propylene glycol, and water. Alternatively, the de-icing fluid may be air. The land vehicle may further comprise: a heater for heating the de-icing fluid.

In the system according to the third aspect of the present invention, the first sensor may comprise a rotating sensor scanning in a plane. This has the advantage that the same rotating sensor can both measure the distance to the physical outside surface of an aircraft and perform a detection of the physical edge of the same aircraft wing. The rotating sensor may be oriented to scan in a vertical plane. Further, the rotating sensor may be a rotating time-of-flight laser range finder.

In the system according to the third aspect of the present invention, the first sensor may be supported by a first sensor support at the first distal end of the support arm. The first sensor may be rigidly connected to the nozzle, which means that they move as a single unit if rotated or transiationally repositioned. When employing the distance sensor in a measurement, this means that disturbances caused by the de-icing fluid when it travels from the nozzle to aircraft wing, to a certain degree, may be compensate for, as volume and flow of expelled de-icing fluid between the nozzle and wing is roughly constant. Rigidly connected may mean that the distance sensor is directly supported by the nozzle, or supported by the same support as the nozzle. Additionally or alternatively, the fluid application direction defined by the nozzle may be parallel to the measurement direction, which may have the advantage that the first distance roughly corresponds to the general distance travelled by the de-icing fluid. Knowing this distance means that it is possible to determine the de-icing effect for a given flow and temperature of the de-icing fluid. Conversely, aiming for a certain de-icing effect and knowing the flow and temperature of the de-icing fluid, this effect may be realised at a certain distance travelled by the de-icing fluid, where this distance now is readily determined.

The first sensor support may be a pivot support for actively changing the sensing direction of the first sensor. By actively changing is meant that the orientation to some extent is actively controlled by the system. Additionally or alternatively, the first sensor support may be a pendulum support for passively providing a vertical sensing direction of the first sensor. This may be achieved by the pendulum support allowing the distance sensor to swing like a pendulum by the force of gravity, which means that the distance sensor is biased towards a certain orientation under normal operation conditions. When applying a de-icing fluid to the aircraft wing, the ice or snow is generally forced in a direction roughly parallel to the upper surface of the aircraft wing. The upper surface in turn defines a normal that, for most of its area, is roughly vertical. Hence, most of the ice will move in a direction perpendicular to the measurement direction, thus causing less noise or disturbances in the distance measurement. Further, the first sensor support may be attached to the nozzle or to the support arm.

The system according to the third aspect of the present invention may further comprising: a second sensor for performing a second detection of a physical edge of an aircraft wing, the second sensor being supported by a second sensor support at the first distal end of the support arm. The second sensor support may be a pivot support for actively changing the sensing direction of the second sensor. By actively changing is meant that the orientation to some extent is actively controlled by the system. Additionally or alternatively, the second sensor support is a pendulum support for passively providing a vertical sensing direction of the second sensor. Further, the second sensor support may be attached to the nozzle or to the support arm.

BRIEF DESCRIPTION OF THE DRAWINGS

The present invention is further revealed in the following detailed description, claims, and drawings. Additional objects, advantages and features may be apparent from the detailed description and the drawings, where:

FIG. 2c is a side view of an extendable support arm having a nozzle and a sensor attached to its distal end, where the sensor is held in position by a pendulum support, FIG. 11 illustrates a fluid application path defining a zigzag pattern along an aircraft wing, FIG. 12 illustrates a fluid application path defining a zigzag pattern across an aircraft wing, FIG. 13 illustrates a fluid application path defining a square pattern along an aircraft wing.

DETAILED DESCRIPTION OF THE INVENTION

Figure 1:
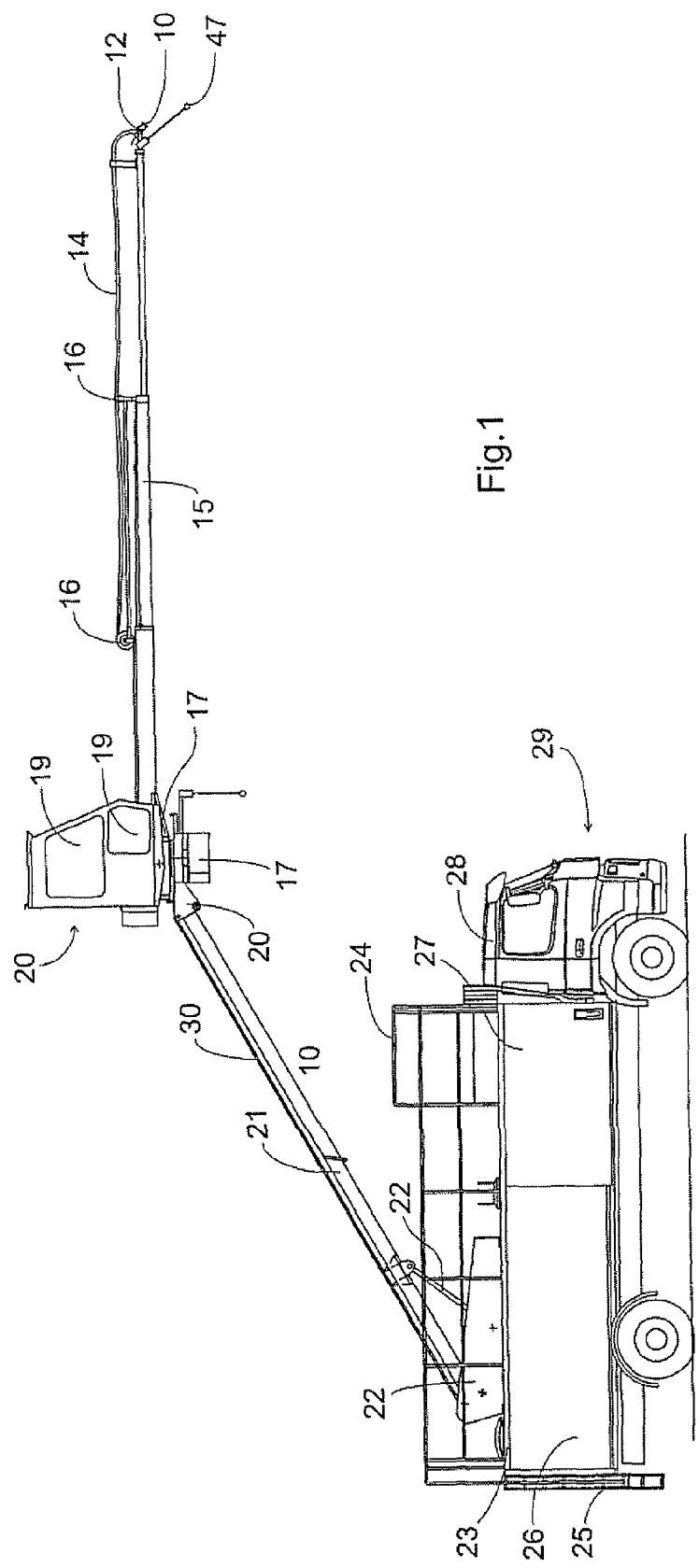
FIG. 1 illustrates a system for de-icing of aircraft wings.

A preferred embodiment of the proposed system for de-icing is illustrated in FIG. 1. The nozzle 10 for supplying a de-icing liquid is supported by a first pivot support that is attached to an extendable support arm 15. The first pivot support 12 provides an adjustable orientation of the nozzle 10 by a horizontal pivot axis allowing a pivotal motion in a vertical plane embedding the adjustable support arm 15, and a normal pivot axis allowing sideways motions with respect to the extendable support arm 15. The first pivot support 12 is also provided with actuation mechanisms enabling an automated pivotal motion of the nozzle 10. The nozzle is supplied with de-icing liquid via conduits 14. The support arm is provided with conduit supports 16 for preventing a slackening of the conduits 14 when the length of the extendable support arm 15 is changed. The support arm 15 is divided into three segments that can slide with respect to one another, thereby enabling a extension of the support arm 15 by a telescopic action. In FIG. 1 the support arm is shown at its maximum extension.

The support arm 15 is supported by a second support 17 attached to a boom 21. The second pivot 17 defines a horizontal pivot axis allowing a pivotal motion in a vertical plane and a vertical pivot axis allowing a pivotal motion in a horizontal plane. A cabin 18 is connected to the vertical pivot axis so that the turning of the cabin 18 is synchronized with the horizontal turning of the support arm 15. The boom 21 in turn is supported by a third pivot support 22. The third pivot 22 defines a horizontal pivot axis allowing a pivotal motion in a vertical plane.

The boom 21 is provided with a parallel displacement joint 20 which is connected to the third pivot support 22 via the boom 21 itself and a parallel displacement bar 30 to define a parallelogram linkage. Thereby, the vertical pivot axis of the second pivot 17 is maintained in a vertical orientation, even though the inclination of the boom 20 is changed.

The third pivot support 22 is anchored to the roof 23 of a housing 26 on a truck 29 behind the driver's cabin 28. A hand rail 24 traces the edge of the roof 22, which can be reached from the ground via a ladder 25 at the back of the truck 29. The housing 26 encloses a tank for storing the de-icing liquid and a pump for supplying the nozzle 10 with pressurized de-icing fluid via the conduits 14. The housing also encloses a heater that can optionally heat the de-icing fluid. The inside of the housing 26 can be reached via a sliding door 27.

A pair of distal contact sensors 47, in form of freely extending rods, is mounted in a downward orientation at the distal end of the support arm 15. If any of these contact sensor sensors come in physical contact with another object, all movements of the support arm 15 and the boom 21 will terminate, which will reduce the risk for collisions with the aircraft while de-icing.

Figure 2A:
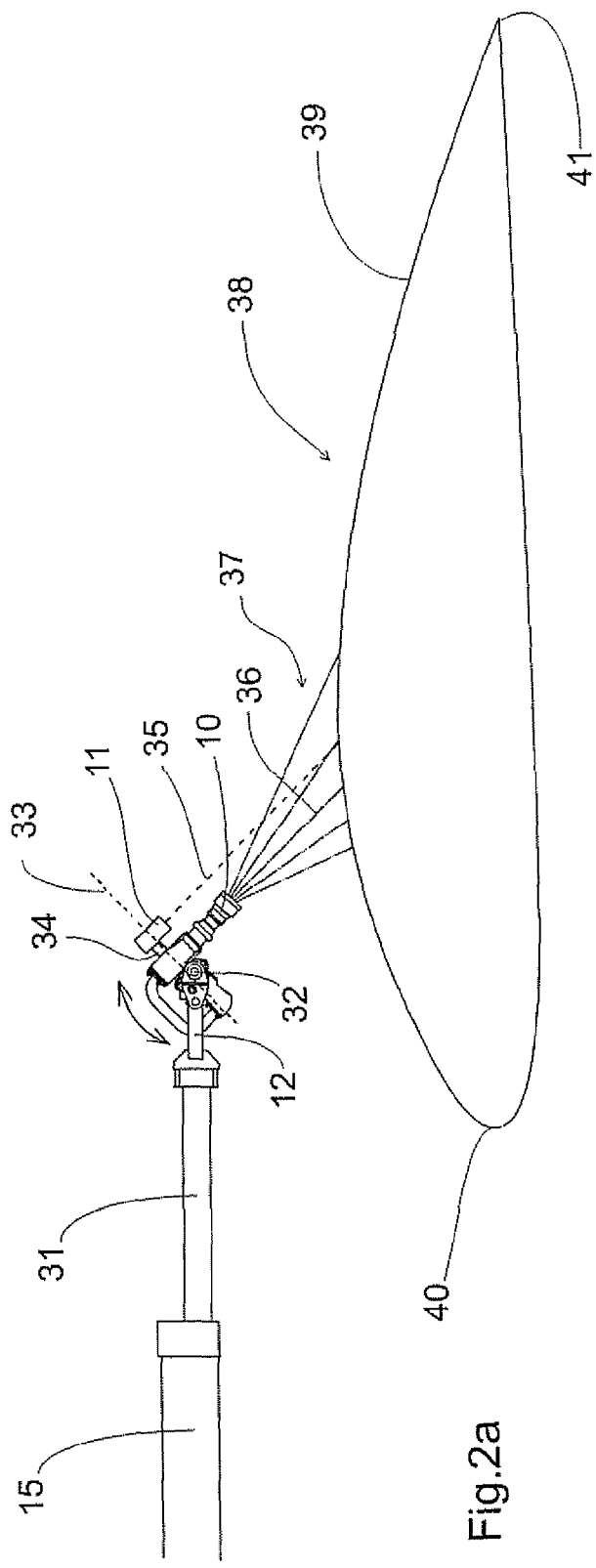
FIG. 2a is a side view of an extendable support arm having a nozzle and a sensor attached to its distal end, where the sensor is rigidly connected to the nozzle.

A preferred embodiment of the distal end of the support arm of the de-icing system is illustrated in FIG. 2a. A first pivot support 12 is attached to the distal end of the distal telescopic segment 31 of the extendable support arm 15. The first pivot support 12 supports a nozzle 10 through which a de-icing liquid can be expelled under pressure. The orientation of the nozzle 10 can be changed by pivoting it around a horizontal pivot axis 32, allowing a pivotal motion in a vertical plane, and a normal pivot axis 33 allowing sideways motions with respect to the extendable support arm 15. A distance sensor 11 in the form of an ultrasonic range finder is rigidly mounted onto the nozzle 10 by a fixed attachment 34. In alternative embodiments the distance sensor 11 can be a laser, radar, or infrared rangefinder. The measurement direction 35 of the distance sensor 11 points in the general direction 36 of the expelled liquid 37. The position of the distance sensor 11 relative to the nozzle 10 is such that, under normal operation conditions, the distance measurements are through the expelled de-icing liquid.

The distance sensor 11 also doubles as a detector for detecting the edges of an aircraft wing 38 by reacting to rapid changes in the distances measured or the loss of a reflexion signal. For example, the distance sensor 11 typically measures a distance in the range of 0.5 to 2 meters to the upper surface 39 of the aircraft wing. If the distance sensor instead would point at the ground, the distance measured would at least be larger than 2.5 meters. The rapid change from a measured distance in the range of 0.5 to 2 meters to a measured distance larger than 2.5 meters then correspond to a detection of the leading edge 40 or the trailing edge 41.

Figure 2B:
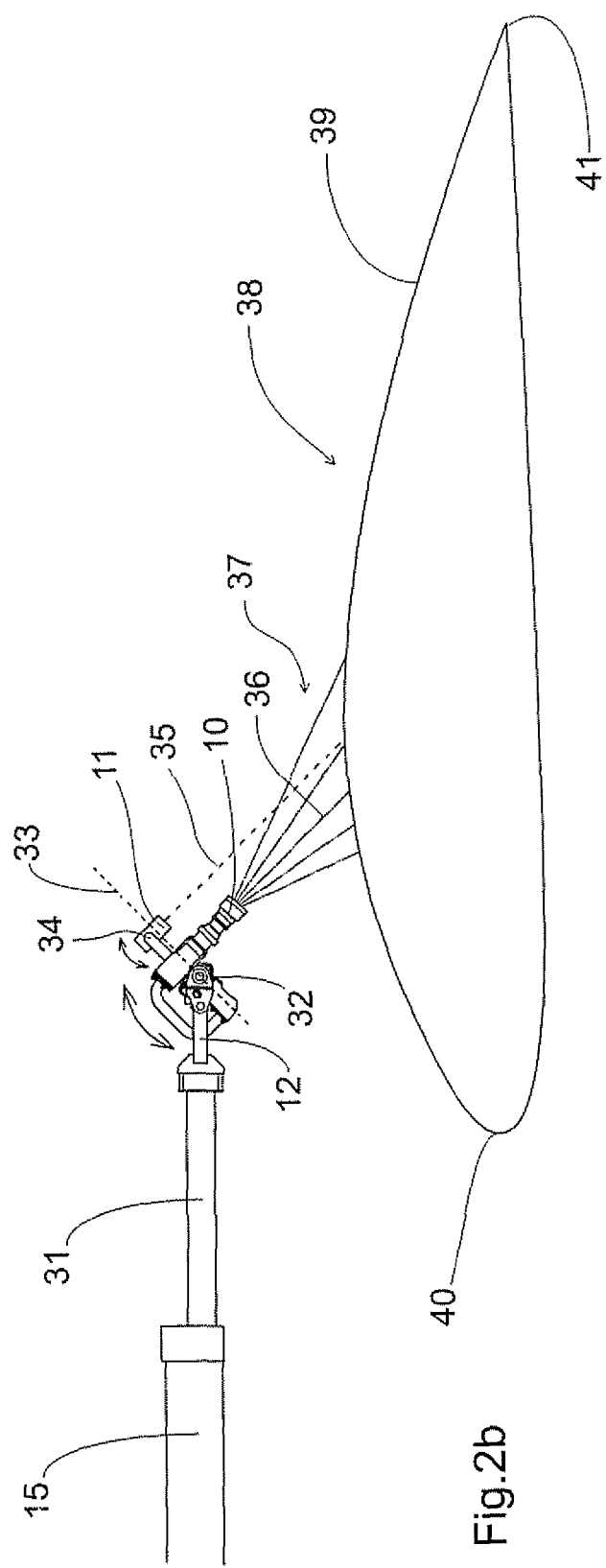
FIG. 2b is a side view of an extendable support arm having a nozzle and a sensor attached to its distal end, where the sensor is pivotally connected to the nozzle.

An alternative embodiment of the distal end of the support arm of the de-icing system is illustrated in FIG. 2b. All features that are common to this embodiment and the previously described embodiments have been given the same index numbers. In this alternative embodiment, the sensor 11 is connected to the nozzle 10 via a pivotal support 42, allowing the sensor 11 to sweep independently from the nozzle, both in a vertical plane and sideways with respect to the nozzle.

Another alternative embodiment of the distal end of the support arm of the de-icing system is illustrated in FIG. 2c. All features that are common to this embodiment and to the previously described embodiments have been given the same index numbers. In this alternative embodiment the sensor 11 is connected to the part of the first pivot support 12 that is fixed relative to the distal segment 31 of the telescopic support arm 15. The connection is achieved via a pendulum sensor support 43 and orients the sensor 11 so that its measurements direction 35 of the sensor 11 is held essentially vertical by the force of gravity.

Figure 3:
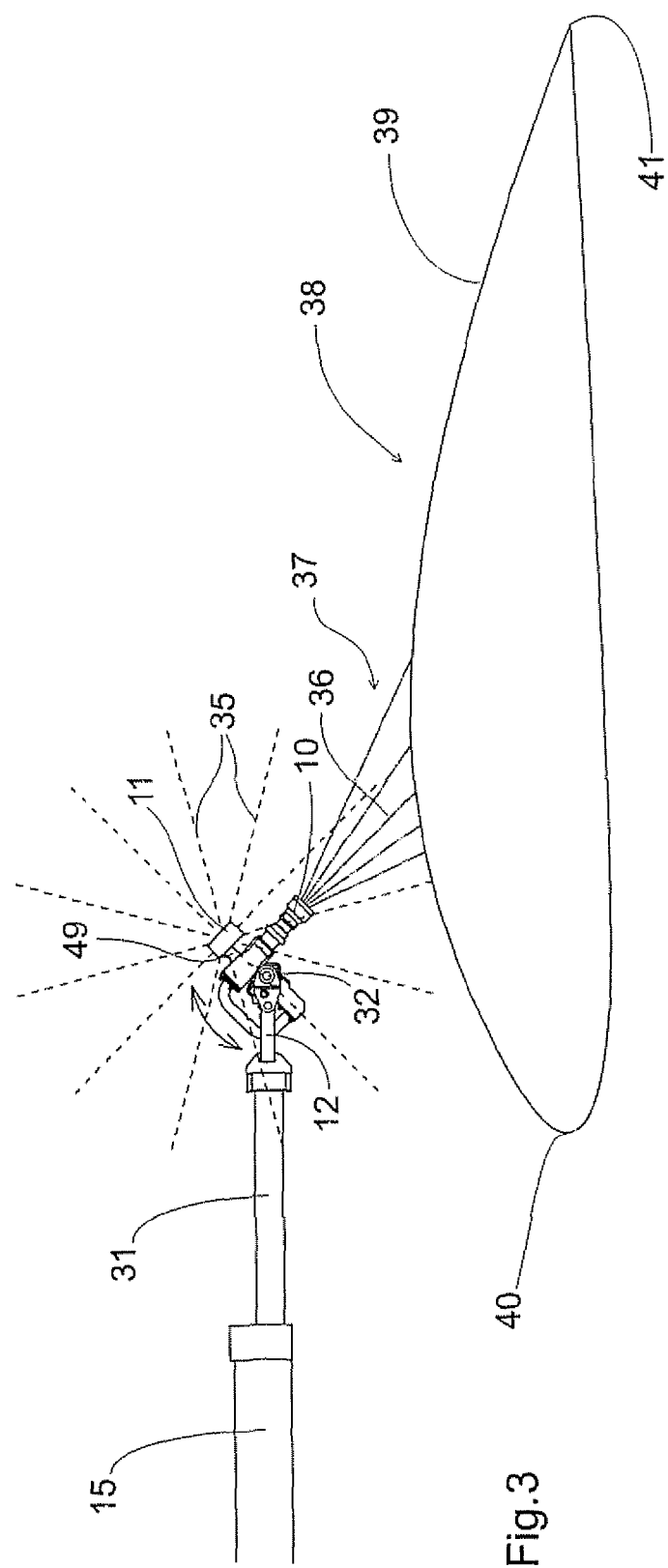
FIG. 3 is a side view of an extendable support arm having a nozzle and a sensor attached to its distal end, where the sensor is rigidly connected to the nozzle and the sensor is a rotating sensor scanning in a vertical plane to detect the surface of a an aircraft wing and the distance thereto.

Yet another alternative embodiment of the distal end of the support arm of the de-icing system is illustrated in FIG. 3. All features in common with the previously described embodiments have been given the same index numbers. In this alternative embodiment, the sensor 11 is connected to the nozzle 10 via a fixed attachment 34, where the distance sensor 11 is a rotating sensor that scans in a vertical plane to detect the surface of the aircraft wing and the distance thereto. By the mounting 49 the rotating sensor 11 is fixed to the fixed pivot support 12, whereby the rotating sensor 11 follows the support arm 15.

Figure 4:
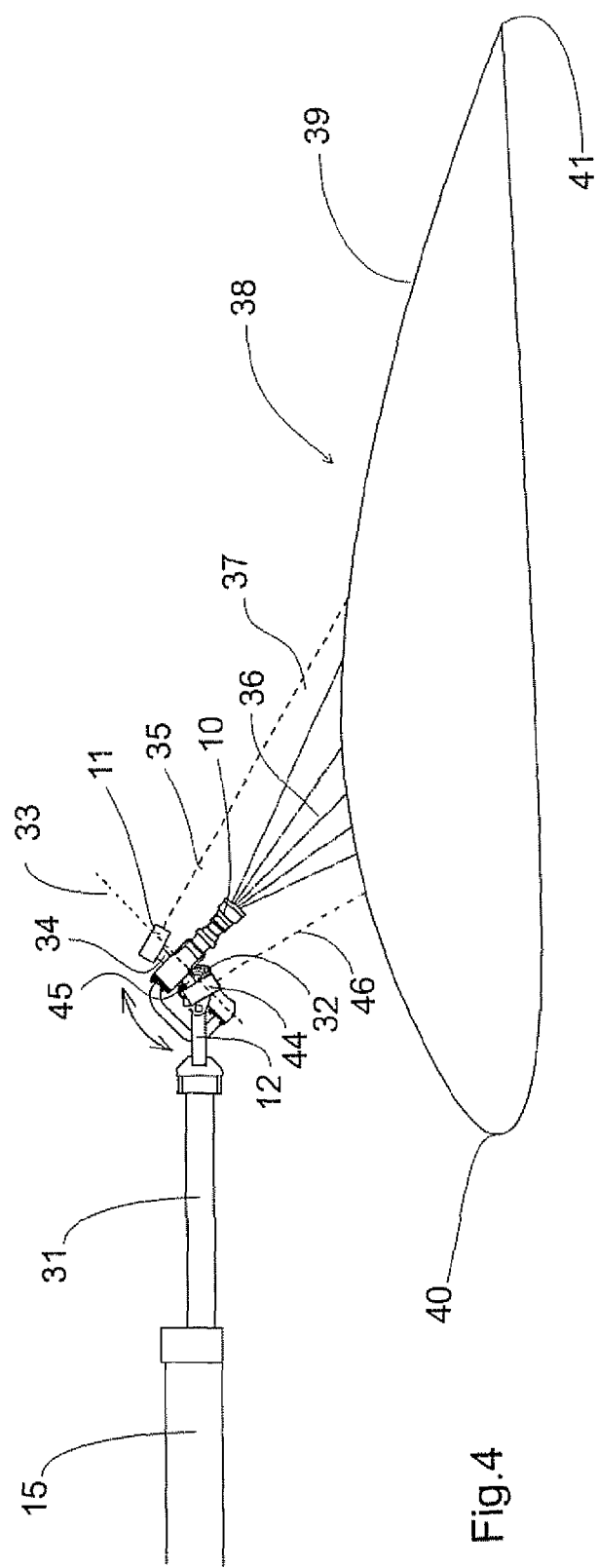
FIG. 4 is a side view of an extendable support arm having a nozzle and two sensors supported at its distal end.

Yet another alternative embodiment of the distal end of the support arm of the de-icing system is illustrated in FIG. 4. All features that are common to this embodiment and the previously described embodiments have been given the same index numbers. In this alternative embodiment, the sensor 11 is connected to the nozzle 10 via a fixed attachment 34. An additional sensor 44 is connected to the nozzle 10 via an additional fixed attachment 45. The sensor 11 is oriented so that, at typical operation conditions, its line of measuring does not point towards the expelled de-icing liquid 37. Similarly, the additional sensor 11 is oriented so that, at typical operation conditions, its line of measuring 46 does not cross the expelled de-icing liquid 37. The placement of the two sensors is such that the two lines-of-measuring are on opposite sides of the expelled de-icing fluid 37. By this, if the sensors are used to detect the edges of the aircraft wing in a vertical sweep by the nozzle 10, the projected de-icing liquid will not cross the edge before detection of the same. Hence, the amount of de-icing liquid lost outside the upper surface 39 of the wing 38 is significantly reduced.

Figure 5:
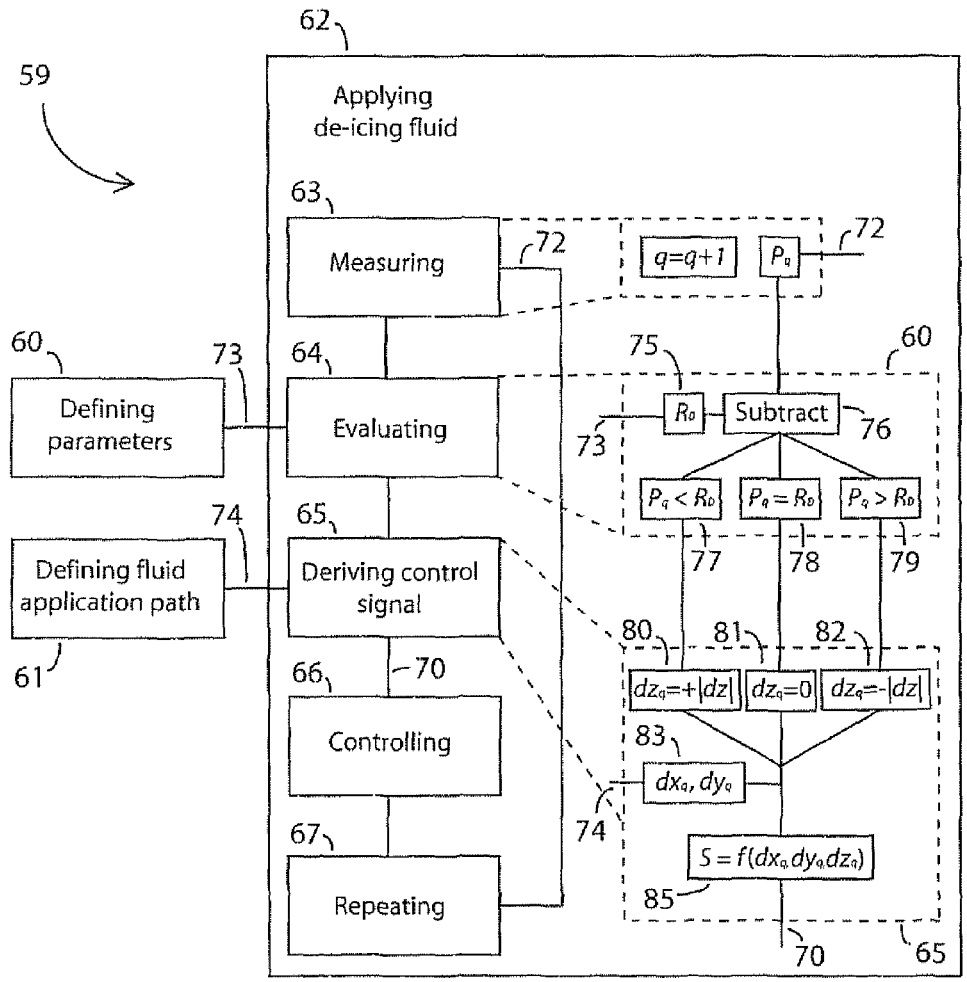
FIG. 5 is a flow chart illustrating an automated method for de-icing an aircraft wing.

A preferred embodiment of the proposed method for de-icing is illustrated in FIG. 5 as a flow-chart 59. Initially, the extendable support arm is manually controlled so that the distance sensor and the nozzle are positioned directly above an aircraft wing. A preferred vertical distance between the distance sensor and the aircraft wing is defined in the step of defining parameters 60. The preferred vertical distance in question has the value $R_0$.

In the step of defining a fluid application path 61, a horizontal plane having the Cartesian coordinates (x,y) is first defined, in which the fluid application path is embedded. The fluid application path is defined as changes in the x and y coordinates, where each change in the x coordinate is represented by the incremental step $dx_i$, and each change in the y coordinate is represented by the incremental step $dy_i$. Here, the subscript i correspond to the order in which the incremental steps are performed. This way, the polygonal fluid application path in the horizontal plane is non-localised and completely defined by the two sets dx and dy having the same integer number n of elements. The two sets can be written as:

$$dx=\{dx_1,dx_2,\ldots,dx_{n-1},dx_n\} \text{ and } dy=\{dy_1,dy_2,\ldots,dy_{n-1},dy_n\}.$$

Here, $dx_i$ and $dy_i$ are real-valued, i.e. they can be positive, zero, or negative. If $(x_0,y_0)$ are defined as the starting coordinates, the localized fluid application path can then be described by a sequence of the coordinates:

$$(x_j, y_j) = \left(x_0 + \sum_{i=1}^{j} dx_j, y_0 + \sum_{i=1}^{j} dy_j\right)$$

In addition to the fluid application path, a vertical line having the coordinate z is defined. Naturally, the vertical line is normal to the horizontal surface embedding the fluid application path. Further, an incremental step dz is defined along the vertical line, where the step has the absolute value |dz|.

A de-icing fluid is applied to the aircraft wing in the step of applying a de-icing fluid 62. This step 62 is performed continuously during all of the following steps, which is illustrated in FIG. 5 by placing all the following steps inside the step of applying a de-icing fluid 62. This means that the de-icing fluid is applied continuously to the aircraft wing during operation.

In the step of measuring 63, an integer counter q, which has the initial value of 0, is first increased by one, whereupon the first distance to the aircraft wing is measured along a vertical measurement direction, giving the measured distance value $P_q$. In the following step of evaluating 64 the preferred distance value $R_0$ is recalled 75 and subtracted 76 from the measured distance value $P_q$.

From the result of the subtraction 76 it is determined whether $P_q$ is smaller than $R_0$ 77, is equal to $R_0$ 78, or $P_q$ is larger than $R_0$ 79.

In the subsequent step of deriving a control signal 65, the incremental steps $dx_q$ and $dy_q$ are recalled from dx and dy 83, respectively, where q correspond to q'th element of the sets. The incremental step $dz_q$ is set to +|dz| if $P_q$ is smaller than $R_0$ 80, to 0 if $P_q$ is equal to $R_0$ 81, or to -|dz| if $P_q$ is larger than $R_0$ 82. The combined incremental steps $(dx_q,dy_q,dz_q)$ correspond to a single step in three-dimensions, which is subsequently inserted into a function f translating it into machine instructions S 85. The machine instructions S are sent as a control signal 70 to an automated control system. In the subsequent step of controlling 66 the automated control system carries out the instructions and moves the nozzle according to the combined incremental steps $(dx_q,dy_q,dz_q)$. In the subsequent step of repeating 67, the operation returns 72 to the step of measuring 63, from which the described process is repeated again, but with the integer counter q increased by one. For the sake of clarity, in FIG. 5 the connection 73 has been indexed to stress that $R_0$ is defined in the step of defining parameters 60, while the connection 74 has been indexed to stress that $dx_q$ and $dy_q$ are defined in the step of defining a fluid application path 61.

Figure 6:
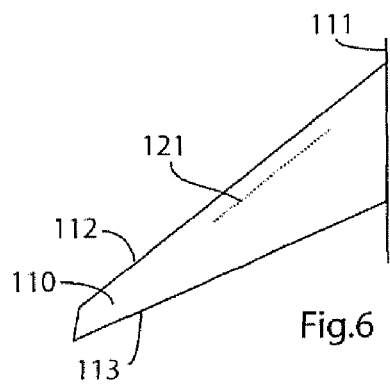
FIG. 6 illustrates a fluid application path defining a fixed horizontal distance to the leading edge of an aircraft wing.
Figure 7:
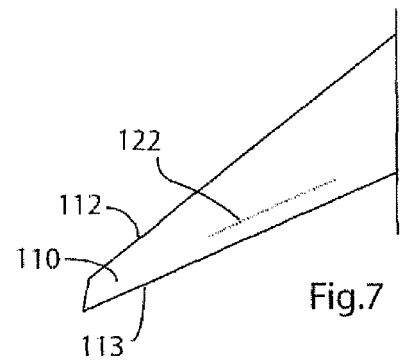
FIG. 7 illustrates a fluid application path defining a fixed horizontal distance to the trailing edge of an aircraft wing.
Figure 8:
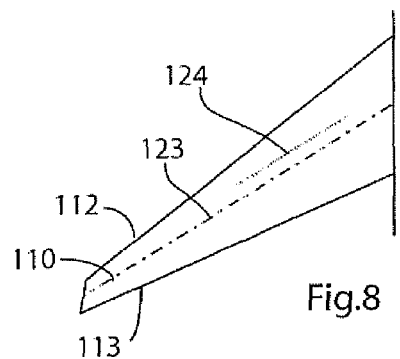
FIG. 8 illustrates a fluid application path defining a fixed horizontal distance to the bisector of an aircraft wing.

In FIG. 6 an aircraft wing 110 having a leading edge 112 and a trailing edge 113 is illustrated. The wing 110 is connected to the fuselage 111 of the aircraft. A fluid application path 121 defining a fixed horizontal distance to the leading edge of an aircraft wing has been outlined. In a preferred embodiment, the fluid application path 121 is achieved by detecting at least two points on the leading edge 112. These points are used to define a horizontal straight line for the case of two points, or polygon in a horizontal plane for the case of more points. The fluid application path is then defined by parallel transporting the straight line or polygon in a horizontal direction so that all the points shift the same horizontal distance. Here, the horizontal shift corresponds to the fixed horizontal distance. In FIG. 7 a fluid application path 122 defining a fixed horizontal distance to the trailing edge 113 of an aircraft wing 110 is illustrated, which instead is achieved by detecting at least two points on the trailing edge 113.

A fluid application path 124 defining a fixed horizontal distance to the bisector 123 of an aircraft wing 110 is illustrated. The bisector 123 is determined by detecting the horizontal position of at least two equidistant points on the leading edge 112 in a first series, and the same number of equidistant points on the trailing edge 113 in a second series. The distance between the points in the first series is the same as between the points in the second series. The points on each edge are ordered according to their distance to the fuselage. Points of the same order in the two series are paired together, where each pair define a line. The bisector 123 is then defined as the polygon through the middle points of these lines. The fluid application path 124 is then defined by a parallel transport of the bisector 123 in the preferred horizontal direction.

Figure 9:
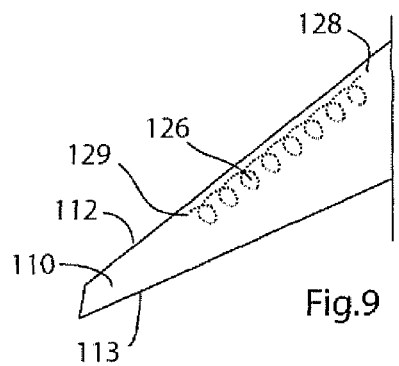
FIG. 9 illustrates a fluid application path defining a series of single-loops having smooth turns.
Figure 10:
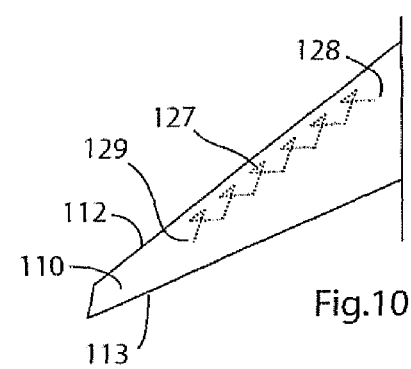
FIG. 10 illustrates a fluid application path defining a series of single-loops having sharp turns.

FIG. 9 and FIG. 10 illustrate fluid application paths defining a series of single-loops having smooth turns 126 and sharp turns 127, respectively. In a preferred embodiment, the fluid application paths are initially non-localized and have no pre-defined orientations with respect to the aircraft wing 110. The placing and orientation are manually defined by an operator by setting two coordinates corresponding to the start point 128 and end point 129 of the fluid application path.

FIG. 11 illustrates a fluid application path 134 defining a zigzag pattern along an aircraft wing 110. In a preferred embodiment, this is achieved by defining a first line 139 and a second line 140 in a horizontal plane. The lines are non-parallel, initially non-localized, and have no pre-defined orientation with respect to the aircraft wing, but have a fixed orientation with respect to one another. An operator defines the start point 135 and the direction for the first line 139, while the end point 136 is determined by detecting the first edge, which in this example is the leading edge 112. The end point 136 is located at a certain distance from the first edge and is subsequently defined as the start point 136 for the second line 140. The direction of the second line 140 is already determined by its predefined relative orientation with respect to the first line 139. The end point 137 of the second line 140 is determined by detecting the second edge, which in this example is the trailing edge 113. The end point 137 is located at a certain distance from the second edge and is subsequently defined as the start point 137 for another line, thereby allowing the fluid application path to be extended in zigzag pattern following a recursive sequence involving the described steps of a detecting edges and defining start and end points.

FIG. 12 illustrates a fluid application path 141 defining a zigzag pattern across an aircraft wing 110. In a preferred embodiment this is achieved by combining the methods described in connection with FIG. 6 and FIG. 7, i.e. by defining a first line 142 being parallel to the leading edge 112 and a second line 143 being parallel to the trailing edge 113. The first turn point 144 and the one or more intermediary turn points 145 of the zigzag pattern are predefined by an operator; while the last turn point 146 is defined by detecting the edge, which in this example is the trailing edge 113. The last turn point is located at a certain distance from the edge.

FIG. 13 illustrates a fluid application path 147 defining a square pattern along an aircraft wing. In a preferred embodiment, this is achieved by defining a first line 148 at a first fixed distance from the edge and a second line 149 at a second fixed distance form the edge. In this example, the edge is the leading edge 112 and the first distance is smaller than the second distance. The fixed distances are obtained by a method similar to that discussed in connection with FIG. 6. The fluid application path is then defined by connecting the paths at predefined intervals, where the connections 150 are substantially perpendicular to the edge.

ITEM LIST 10 nozzle
11 sensor
12 first pivot support
14 conduits
15 support arm
16 conduits support
17 second pivot support
18 cabin
19 cabin windows
20 parallel displacement joint
21 boom
22 boom support
23 roof
24 hand rail
25 ladder
26 housing
27 door
28 vehicle cabin
29 truck or land vehicle
30 parallel displacement bar
31 distal segment
32 horizontal pivot axis
33 normal pivot axis
34 fixed attachment
35 measurement direction/line-of-measurement
36 general direction of expelled de-icing liquid
37 expelled de-icing liquid
38 aircraft wing
39 upper surface
40 leading edge
41 trailing edge
42 pivotal sensor support
43 pendulum sensor support
44 additional sensor
45 additional fixed holder
46 additional measurement direction/additional line-of-measurement
47 distal contact sensor
59 flowchart
60 Step of defining parameters
61 step of defining a fluid application path
62 step of applying a de-icing fluid
63 step of measuring
64 step of evaluating
65 step of deriving a control signal
66 step of controlling
67 step of repeating
72 return
75 $R_0$ is recalled
76 subtraction
77 smaller than $R_0$
78 equal to $R_0$
79 larger than $R_0$
80 $dz_q$ equals $+|dz|$
81 $dz_q$ equals 0
82 $dz_q$ equals $-|dz|$
83 recalling $dx_q$ and $dy_q$
85 machine instructions S
110 aircraft wing
111 fuselage
112 leading edge
113 tailing edge
121 fluid application path defining a fixed horizontal distance to the leading edge
122 fluid application path defining a fixed horizontal distance to the trailing edge
123 bisector of an aircraft wing
124 fluid application path defining a fixed horizontal distance to the bisector
126 fluid application path defining a series of single-loops having smooth turns
127 fluid application path defining a series of single-loops having sharp turns
128 start point
129 end point
132 start point
133 end point 134 fluid application path defining a zigzag pattern along an aircraft wing
135 start point
136 end/start point
137 end point
139 first line
140 second line
141 application path defining a zigzag pattern across an aircraft wing
142 first line
143 second line
144 first turn point
145 one or more intermediary turn points
146 last turn point
147 fluid application path defining a square pattern along an aircraft wing
148 first path
149 second path
150 connections

The invention claimed is:

1. A method for at least partially de-icing an aircraft by automatically applying a de-icing fluid through a nozzle, said method comprising the steps of:
measuring a first distance, using a first sensor, along a measurement direction line from a first location relative to said nozzle to a physical outside surface of said aircraft wherein said physical outside surface is an aircraft wing, the measurement direction line being outside a fan spray zone of de-icing fluid when being expelled through the nozzle,
providing a first reference distance and a second reference distance;
comparing the first distance and the first reference distance;
comparing the first distance and the second reference distance;
moving the nozzle one of a) away from said physical outside surface if said first distance is smaller than said first reference distance or b) towards said physical outside surface if said first distance is larger than said second reference distance; and
detecting a physical edge of said aircraft wing using the first sensor and a second sensor, said second sensor detecting along a detection direction line from a second location relative to the nozzle, the detection direction line being outside the fan spray zone of de-icing fluid when being expelled through the nozzle and on an opposite side of the fan spray zone than the measurement direction line, wherein the edge is at least one of a leading edge or a trailing edge of the aircraft wing, and
applying said de-icing fluid automatically through said nozzle to at least a part of said physical outside surface.

2. The method according to claim 1, wherein the first and the second reference distances are identical.

3. The method according to claim 1, wherein said measurement direction is vertical.

4. The method according to claim 3, further including the step of obtaining the vertical measurement direction by using a sensor that is supported by a pendulum support.

5. The method according to claim 1, wherein said first location and said second location are the same.

6. The method according to claim 1, wherein said measurement direction line and said detection direction line are co-linear.

7. The method according to claim 1, further comprising the step of: positioning said nozzle above said aircraft wing.

8. The method according to claim 1, further comprising the sub-step of: moving said nozzle along a first path above said aircraft wing.

9. The method according to claim 8, further comprising the sub-step of: determining the location of a first start point and the location of a first end point relative to said physical edge of said aircraft wing for said first path.

10. The method according to claim 9, wherein said first start point is closer to the trailing edge than said first end point and said first end point is closer to the leading edge than said first start point.

11. The method according to claim 9, further comprising the sub-steps of:
determining the location of a second start point and the location of a second end point relative to said physical edge of said aircraft wing, said second start point being closer to said leading edge than said second end point and said second end point being closer to said trailing edge than said second start point, and
moving said nozzle along a second path from said second start point to said second end point.

12. The method according to claim 11, wherein one of said first end point of said first path and said second start point of said second path have the same location and join said first path and said second path, or said second end point of said second path and said first start point of said first path have the same location and join said second path and said first path.

13. The method according to claim 11, further comprising the sub-steps of:
determining the location of a third start point and the location of a third end point, said third start point and said third end point having approximately the same distance to the leading edge or the trailing edge of said aircraft wing; and
moving said nozzle along a third path from said third start point to said third end point.

14. The method according to claim 13, wherein said first path is in a first vertical plane, and/or said second path is in a second vertical plane, and/or said third path is in a third vertical plane.

15. The method according to claim 14, wherein said first vertical plane and said second vertical plane are parallel.

16. The method according to claim 13, wherein said third path defines an approximately constant distance to the leading edge or the trailing edge of said aircraft wing.

17. The method according to claim 13, wherein one of said first end point of said first path and said third start point of said third path have the same location and join said first path and said third path, or said second end point of said second path and said third start point of said third path have the same location and join said second path and said third path.

18. The method according to claim 13, wherein one of said third end point of said third path and said second start point of said second path have the same location and join said third path and said second path, or said third end point of said third path and said first start point of said first path have the same location and join said third path and said first path.

19. The method according to claim 13, wherein at least one of said first path, said second path or said third path is a linear segment of a zigzag pattern of a fluid application path for said nozzle.

20. The method according to claim 13, wherein at least one of said first path, said second path or said third path is a linear segment of a square or trapezium pattern of a fluid application path for said nozzle.

21. The method according to claim 1, wherein said providing a detection step further comprises the sub-step of: providing a minimum horizontal displacement between said nozzle and the edge of said aircraft wing.

22. The method according to claim 1, further comprising the step of: terminating the step of applying of said de-icing fluid.

23. The method according to claim 1, further comprising the step of: controlling the orientation of the nozzle in dependence of the comparison of the first and second reference distances with the first measured distance.

24. The method according to claim 1, wherein the first sensor is disposed on an opposite side of the nozzle from the second sensor.

25. The method according to claim 1, wherein applying said de-icing fluid automatically through said nozzle, results in said de-icing fluid not being applied beyond the detected edge of the outside surface based on detecting the physical edge of the aircraft wing using the first sensor and the second sensor.

\* \* \* \* \*